United States Patent Office 2,842,204
Patented July 8, 1958

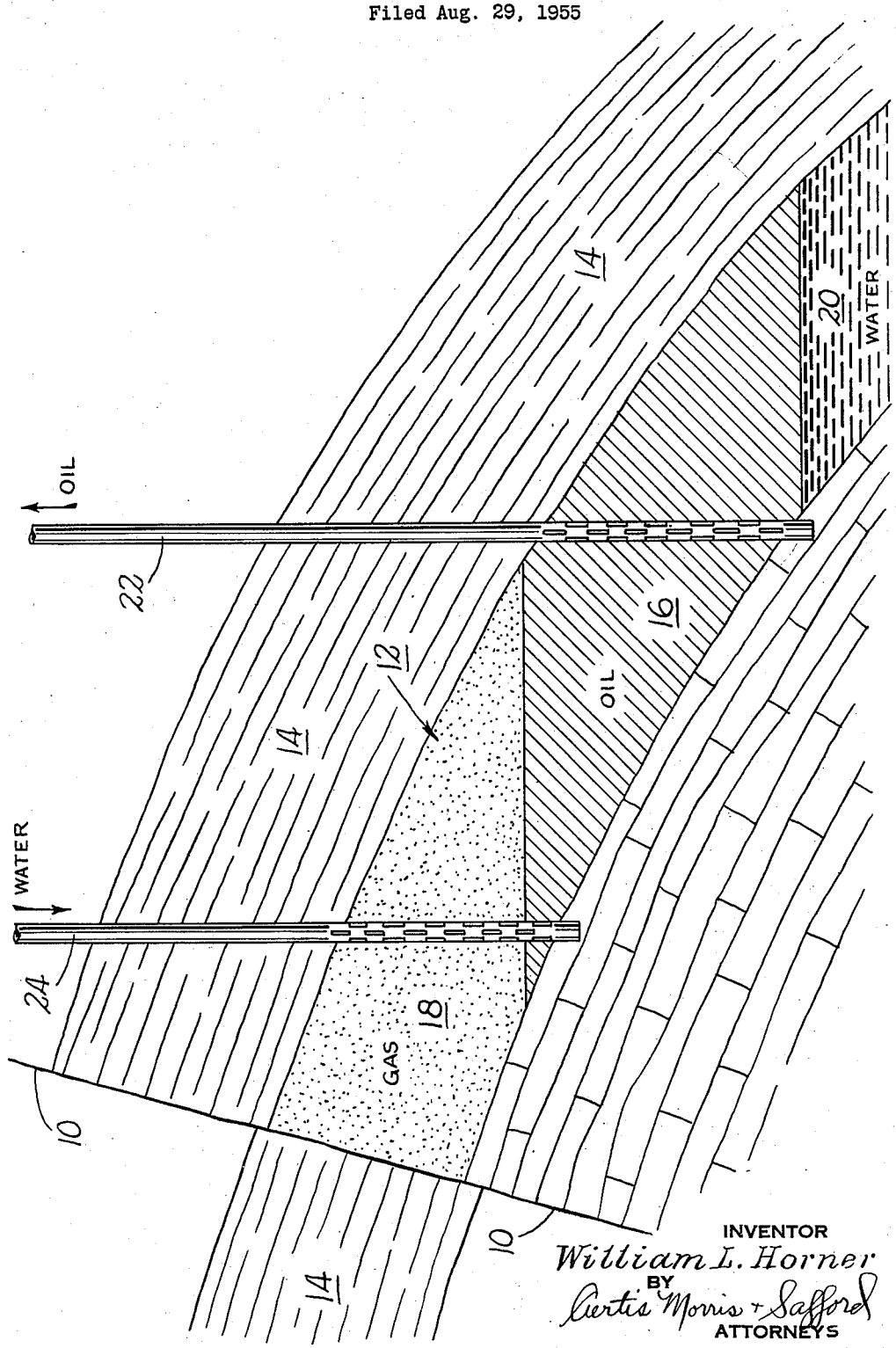

2,842,204

METHOD OF INCREASING OIL RECOVERY

William L. Horner, Dallas, Tex., assignor to Core Laboratories, Inc., Dallas, Tex., a corporation of Texas Application August 29, 1955, Serial No. 531,151

5 Claims. (Cl. 166—9)

This invention concerns a method of increasing oil recovery from subterranean reservoirs having free gas caps.

It is well known that wastage of oil occurs when oil in subterranean reservoirs expands or is driven into portions of the reservoir from which it is not commercially feasible to recover it.

As oil or gas is withdrawn from a reservoir, the pressure in the reservoir is proportionally reduced. This allows the oil mass to expand in all directions within the permeable stratum. The expansion is considerably increased if pressure is reduced below the bubble point and the gas dissolved in the oil is allowed to come out of solution.

In reservoirs having gas caps, the pressure reduction allows the oil to invade the gas-bearing area. This tendency of the oil mass to move in the direction of the gas bearing area is particularly strong if gas is produced from the gas cap, because such production, in addition to reducing the overall reservoir pressure and allowing expansion of the oil mass, also creates a pressure gradient favorable to movement of the oil mass in the direction of the gas bearing area.

Gas wells have sometimes been allowed to blow in the hope that oil would eventually be produced from these wells. While in many instances, these wells have ultimately produced oil after the head of gas has blown off by prolonged gas production, the reduction of pressure which accompanied the gas production allowed the oil to expand or be driven into the gas-bearing portion, with resulting wastage in the amount of oil ultimately recoverable. This wastage probably amounts to at least half of the amount of oil which invades the gas area.

In order to prevent such wastage and obtain maximum oil recovery, various attempts have heretofore been made to maintain reservoir pressure at or near the original level as long as possible during the primary productive life of an oil reservoir, or to "repressurize" the reservoir after its natural pressure has been depleted and thereby obtain a secondary recovery of oil. Such methods include water injection, gas recycling and gas repressurization. Water injection and gas recycling are subject to the substantial disadvantage that they result in driving a portion of the oil into the gas-bearing portion of the reservoir. Gas repressurization, on the other hand, tends to drive the oil in all directions and into areas from which its recovery is not feasible. It is also very difficult to confine the injected gas to precisely the desired area.

The present invention provides a method of increasing oil recovery from reservoirs having gas caps which is free from most of the disadvantages inherent in previously known methods of pressure maintenance or repressurization.

The drawing is a diagrammatic representation of a vertical section through a petroleum reservoir showing the relative locations of a well drilled for oil production and a well drilled for the purpose of water injection in accordance with the principles of the present invention.

The idealized reservoir of the drawing is illustratively shown as a stratigraphic trap formed by faulting along the line designated 10. The reservoir is defined by a permeable stratum 12, for example of sandstone, having a substantial "dip" or slope with an overlying impermeable layer 14, for example of shale, forming a permeability barrier. The reservoir includes not only a pool of oil, indicated at 16, but also an overlying gas cap, indicated at 18. Below the lower limit of the oil pool, the reservoir is filled with water, as indicated at 20.

Of course, the gas-oil and gas-water contacts are not sharply defined interfaces but transitional zones in which the relative saturation of one fluid is increasing while that of the other is correspondingly decreasing.

The reference numeral 22 designates one of a row of wells drilled for oil production. These wells preferably penetrate the oil pool 16 at its approximate center.

The reference numeral 24 designates one of a row of wells drilled for purposes of water injection in accordance with the principles of the present invention. These wells penetrate the reservoir at points near the up-dip limit of the gas-oil contact, that is, near the edge of the gas-oil interface which is nearest the top of the structural or stratigraphic trap. By way of example, this line of injection wells 24 may suitably be so located that the area of the reservoir in the up-dip direction from the line of the injection wells (i. e., to the left as viewed in the drawing) contains approximately 85 percent of the gas reservoir volume and 1 percent of the oil reservoir volume, while the area on the down-dip side of the line of wells contains approximately 99 percent of the oil reservoir volume and 15 percent of the gas reservoir volume.

Water is injected under pressure through the injection wells 24 into the reservoir. The volume of water thus injected is so related to the volume of oil produced from the production wells 22 that the pressure within the reservoir is initially maintained at approximately its pre-production level. A portion of the injected water, of course, may be water which is produced along with oil from the same field.

The injection of the water in the particular region indicated forms a water block which effectively prevents flow of oil from the oil-bearing area of the reservoir into the gas-bearing area.

Preferably, during the water injection operation, no gas is produced from wells which penetrate the gas cap. Thus, since both the volume of free gas and the reservoir pressure remain substantially constant, there will be no appreciable change in the area occupied by the gas cap. The injected water will therefore tend to flow into the oil-bearing area, flushing out the oil and driving it toward the production wells.

Since a portion of the reservoir gas lies on the down-dip side of the line of injection wells 24, a certain amount of gas is driven under pressure ahead of the injected water and into the oil-bearing area of the reservoir. This has several beneficial effects. For example, the gas driven into the oil-bearing area tends to reduce the viscosity of the oil and enhance its flow toward the production wells 22. The gas produced at these latter wells lightens the fluid column and reduces the amount of work required to lift the oil to the surface. Moreover, the gas driven ahead of the injected water forms a gas saturation in the oil pool immediately prior to the water flooding, which results in greater oil production than would be obtained by displacement at the bubble point pressure.

By way of contrast, an attempt to achieve this same effect by reducing the reservoir pressure and allowing gas to evolve from oil solution would have the disadvantage of reducing the gas-drive energy while increasing the viscosity of the oil, thereby reducing the amount of oil recoverable.

According to one specific method within the broad scope of the invention, the injection of extraneous water is continued until oil production begins to decline appreciably. As this occurs, the gas-oil ratio of the production wells increases so that the rate of gas production from these wells is partially sustained even though the rate of oil production declines. Thereafter, the water injection may be limited to the amount of water required for disposal of the water produced from the field along with the oil. This has the advantage of disposing of the water produced while at the same time retarding pressure decline, although not entirely preventing it.

As pressure in the reservoir ultimately declines, the gas in the gas cap expands, driving the injected water away from the gas cap and into the oil zone. By virtue of the fact that the injected water is interposed between the expanding gas cap and the oil sand, the oil sand will be flushed by water and more of the oil will be produced than if the flushing action were by the expanding gas from the gas cap.

In some fields, it might be found better to inject the water more directly into the gas cap so as to fill the gas cap with water to a greater extent than disclosed hereinabove. In other fields, conditions may favor water injection at a point some distance below the up-dip limit of the gas-oil contact. For example, it may be found expedient merely to inject the water into existing wells initially drilled for oil production. While this would result in excluding some of the reservoir oil, this situation could ultimately be remedied by drilling additional wells, if justified by the added recovery expected.

As will readily be understood, the invention is applicable not only to reservoirs having primary gas caps but also to reservoirs having secondary gas caps formed by gas which has evolved out of solution in the oil when pressure in the reservoir has been reduced below the bubble point, and which has separated from the oil by gravity, capillarity or other forces.

From the foregoing description, it will be appreciated that the present invention provides a method for enhancing the ultimate recovery of oil from subterranean reservoirs. However, it should be emphasized that the particular methods which are described herein are intended as merely illustrative of the invention, rather than as restrictive, and that the methods disclosed may be altered to suit varying local conditions without departing from the scope of the invention, as defined by the accompanying claims.

I claim:

1. A method of enhancing oil recovery from a subterranean petroleum reservoir having in at least one area an appreciable dip and containing an oil pool with a free gas cap, which comprises injecting water into said reservoir through one or more injection wells penetrating said reservoir in the general area of the up-dip limit of the gas-oil contact while removing oil from said reservoir through one or more production wells penetrating said reservoir on the down-dip side of said injection wells in the area of said oil pool to cause a portion of the gas in said gas cap to be driven ahead of said injected water into the area originally occupied by said oil pool to flush oil therefrom and drive the same toward said production wells.

2. A method of enhancing oil recovery from a subterranean petroleum reservoir having in at least one area an appreciable dip and containing an oil pool with a free gas cap, which comprises injecting into said reservoir through one or more injection wells penetrating said reservoir in the general area of the up-dip limit of the gas-oil contact sufficient volumes of water to maintain the pressure within the reservoir at a substantially uniform level at least temporarily during the production of oil from the reservoir while removing oil from said reservoir through one or more production wells penetrating said reservoir on the down-dip side of said injection wells in the area of said oil pool to cause a portion of the gas in said gas cap to be driven ahead of said injected water into the area originally occupied by said oil pool to flush oil therefrom and drive the same toward said production wells.

3. A method of enhancing oil recovery from a subterranean petroleum reservoir having in at least one area an appreciable dip and containing an oil pool with a free gas cap, which comprises injecting water into said reservoir through a series of injection wells spaced in a line extending along the general area of the up-dip limit of the gas-oil contact while removing oil from said reservoir through one or more production wells penetrating said reservoir on the down-dip side of said injection wells in the area of said oil pool to cause a portion of the gas in said gas cap to be driven ahead of said injected water into the area originally occupied by said oil pool to flush oil therefrom and drive the same toward said production wells.

4. A method of enhancing oil recovery from a subterranean petroleum reservoir having in at least one area an appreciable dip and containing an oil pool with a free gas cap, which comprises injecting extraneous water into said reservoir through one or more injection wells penetrating said reservoir near the up-dip limit of the gas-oil contact while removing oil from said reservoir through one or more production wells penetrating said reservoir on the down-dip side of said injection wells in the area of said oil pool to cause a portion of the gas in said gas cap to be driven ahead of said injected water into the area originally occupied by said oil pool to flush oil therefrom and drive the same toward said production wells, and terminating such injection of extraneous water when the oil production from said reservoir commences to decline appreciably.

5. A method of enhancing oil recovery from a subterranean petroleum reservoir having in at least one area an appreciable dip and containing an oil pool with a free gas cap, which comprises injecting into said reservoir through one or more injection wells penetrating said reservoir near the up-dip limit of the gas-oil contact water produced from the field in which said reservoir is located and an additional volume of water sufficient to maintain the pressure within said reservoir at a substantially uniform level during an early stage of the production of oil from said reservoir while removing oil from said reservoir through one or more production wells penetrating said reservoir on the down-dip side of said injection wells in the area of said oil pool to cause a portion of the gas in said gas cap to be driven ahead of said injected water into the area originally occupied by said oil pool to flush oil therefrom and drive the same toward said production wells, terminating such injection of extraneous water when the oil production from said reservoir commences to decline sharply, and thereafter continuing to inject only the volumes of water required for disposal of the water produced from said field.

References Cited in the file of this patent

UNITED STATES PATENTS

| | | |
|---|---|---|
| 1,190,267 | Dunn | July 11, 1916 |
| 1,238,355 | Squires | Aug. 28, 1917 |
| 1,885,807 | Doherty | Nov. 1, 1932 |
| 2,135,319 | Bays | Nov. 1, 1938 |
| 2,623,596 | Whorton | Dec. 30, 1952 |
| 2,690,806 | Britton et al. | Oct. 5, 1954 |

OTHER REFERENCES

Transparent model of reservoir showing displacement of oil by conjoint use of gas and water, World Oil, October 1947, pp. 145–148.